United States Patent [19]

Kefer

[11] Patent Number: 4,942,404
[45] Date of Patent: Jul. 17, 1990

[54] PASSIVE DOPPLER DIFFERENTIAL RANGING SYSTEM AND METHOD

[75] Inventor: Marvin S. Kefer, Massapequa, N.Y.

[73] Assignee: AIL Systems, Inc., Deer Park, N.Y.

[21] Appl. No.: 381,763

[22] Filed: Jul. 18, 1989

[51] Int. Cl.$^5$ ............................ G01S 5/02; G01S 3/52
[52] U.S. Cl. ................................... 342/418; 342/107; 342/109
[58] Field of Search ................... 342/418, 107, 109

[56] References Cited

U.S. PATENT DOCUMENTS 4,158,202  6/1979  Hubka et al.

OTHER PUBLICATIONS

*Range-Doppler Imaging with Motion Through Resolution Cells,* IEEE Transactions on Aero-Space and Electronic Systems, vol. AES 5, No. 1, Jan. 1969.

*F-16 Pulse Doppler Radar (AN/APG66) Performance,* IEEE Transactions on Aero-Space and Electronic Systems, vol. AES-19, No. 1, Jan. 1983.

*Primary Examiner*—Theodore M. Blum
*Attorney, Agent, or Firm*—Hoffmann & Baron

[57] ABSTRACT

A passive doppler differential ranging method for use with respect to an aircraft radar for determining the range, R, of a threat passively, includes the steps of mounting a first receiving antenna and a second receiving antenna on an aircraft and positioning the first and second antennas a known distance, d, apart from each other, and determining the azimuth angle α of the threat with respect to the aircraft at a first time $t_o$. A first differential doppler phase shift, $\Delta\phi$, between the first and second antennas of a received signal transmitted by the threat at time $t_o$ is then determined. The velocity of the aircraft is measured, and a second differential phase shift, $\Delta\phi_1$, between the first and second antennas of a received signal transmitted by the threat at time $t_1$ is then determined. The differential differential doppler phase shift, $\Delta\Delta\phi$, is determined by subtracting the first differential doppler phase shift from the second differential doppler phase shift, and the range, R, of the threat at time $t_1$ is then determined. The passive doppler differential ranging system includes two antennas and preferably includes an interferometer which is used to determine the differential doppler phase shift at time $t_o$.

2 Claims, 1 Drawing Sheet

PASSIVE DOPPLER DIFFERENTIAL RANGING SYSTEM AND METHOD

This invention was made with Government support under Contract No. F33657-81-C-0214 awarded by the U.S. Air Force. The Government has certain rights in this invention.

BACKGROUND OF THE INVENTION

Field of the Invention

This invention relates to a passive radar ranging system and method, that is, using only the threat radar's signal to calculate the range of the threat, and more particularly relates to a passive doppler differential ranging system and method.

Description of the Prior Art

Conventional radar systems employ various methods to calculate the range of a threat radar passively. One such method is commonly referred to as a triangulation ranging technique.

Triangulation ranging is shown in FIG. 1. Two separate receivers, R1 and R2, situated at two remote locations, X and Y, respectively, detect the target at different azimuth angles, $\Theta_1$ and $\Theta_2$. The radar system would take the azimuth information obtained from the two receivers and the distance d between the two receiver locations and would triangulate their intersection to resolve the target's range.

Triangulation techniques may be applied in airborne ranging radars. For example, two airplanes may be used, each carrying one of the radar receivers, R1 and R2. If the spacing between the two radars is determined accurately, i.e., to calculate the distance d, and the azimuth angles, $\Theta_1$ and $\Theta_2$, of the threat from the two radar receivers are measured, then triangulation between the two airplanes and the threat radar will result in the range of the threat.

Triangulation techniques may also be employed with a single airplane by having two radar receivers mounted on the airplane a distance d apart from each other and knowing the azimuth angles $\Theta_1$ and $\Theta_2$ of the threat from the receivers.

It is evident from the above description that conventional triangulation ranging techniques require two separate azimuth angle measurements.

OBJECTS AND SUMMARY OF THE INVENTION

It is an object of the present invention to provide a passive radar ranging system and method which are adapted to airborne radar applications.

It is another object of the present invention to provide a passive doppler differential ranging system and method.

It is yet a further object of the present invention to provide an airborne radar system which employs an alternative approach to radar ranging than that of known radar systems using conventional triangulation techniques.

It is yet another object of the present invention to provide a radar system which passively calculates the range of a threat radar rapidly and relatively inexpensively.

It is yet a further object of the present invention to provide a passive ranging system and method which use a direct calculation of range instead of a complicated computer algorithm.

In accordance with one form of the present invention, a method, which is perfectly adaptable for use on an aircraft, for determining the range, R, of a threat passively, comprises the step of mounting a first receiving antenna and a second receiving antenna on an aircraft and positioning the first and second antennas at a known distance, d, apart from each other. A first azimuth angle, $\alpha$, of the threat with respect to the aircraft at a first time $t_o$, is determined. The azimuth angle, $\alpha$, is defined as the angle of the threat from the direction of motion of the aircraft taken in a two-dimensional plane at the first time $t_o$.

A first differential doppler phase shift, $\Delta\phi$, between the first and second antennas of a received signal transmitted by the threat is determined using the equation:

$$\Delta\phi = \frac{2\pi d}{\lambda} \cdot \sin \alpha$$

where $\lambda = \dfrac{\text{speed of light}}{\text{frequency of the received signal transmitted by the threat}}$ A second differential phase shift, $\Delta\phi$, between the first and second antennas of a received signal transmitted by the threat, at a later time, $t_1$, is determined using the equation:

$$\Delta\phi_1 = \frac{360 \cdot d}{\lambda} \sin\left(\tan^{-1}\left[\frac{R \sin \alpha}{R \cos \alpha} - v\Delta t\right]\right)$$

where $\Delta t = t_1 - t_o$ where $\Delta t = t_1 - t_o$
and where v is the velocity of the aircraft which is measured and assumed to be constant.

Next in the method is the step of determining the differential differential doppler phase shift, $\Delta\Delta\phi$. This is calculated by subtracting the first differential doppler phase shift, $\Delta\phi$, from the second differential doppler phase shift, $\Delta\phi_1$.

The range, R, of the threat at time $t_1$ is then determined by using the following equation:

$$R = \frac{v\Delta t}{\cos \alpha - \dfrac{\sin \alpha}{\tan\left[\sin^{-1}\left(\dfrac{\Delta\Delta\phi \cdot \lambda}{360 \cdot d} + \sin \alpha\right)\right]}}$$

where $\Delta t = t_1 - t_o$

In accordance with one form of the present invention, a passive doppler differential ranging system includes a pair of first and second antennas spaced apart by a known distance, d, and an interferometer or other device interconnected to the two antennas. The interferometer is adapted to determine the first azimuth angle, $\alpha$, of the threat from the aircraft at a first time $t_o$. The antennas are preferably situated near the wing tips of the aircraft to increase the separation distance, d, as much as possible.

The system determines the first differential doppler phase shift, $\Delta\phi$, which is based on the first azimuth angle, $\alpha$, measured at time $t_o$, and the second differential doppler phase shift, $\Delta\phi_1$, which is the differential phase shift at a later time, $t_1$, and is based on the first azimuth angle, $\alpha$, the velocity, v, of the aircraft, and difference between times $t_1$ and $t_o$.

A further calculation is made by the system. This calculation is to determine the differential differential doppler phase shift, $\Delta\Delta\phi$, that is, the difference between the two differential doppler phase shifts determined previously. The differential differential doppler phase shift is used to calculate the range using the equation described previously.

It is apparent from the above description of the invention that only one azimuth measurement need be made. The range of the threat at time $t_1$ may be calculated from only one azimuth measurement and from knowing the velocity of the aircraft and the time $t_o$ when the azimuth measurement was made.

These and other objects, features and advantages of this invention will be apparent from the following detailed description of illustrative embodiments thereof, which is to be read in connection with the accompanying drawings.

DETAILED DESCRIPTION OF THE PREFERRED EMBODIMENTS

Figure 1:
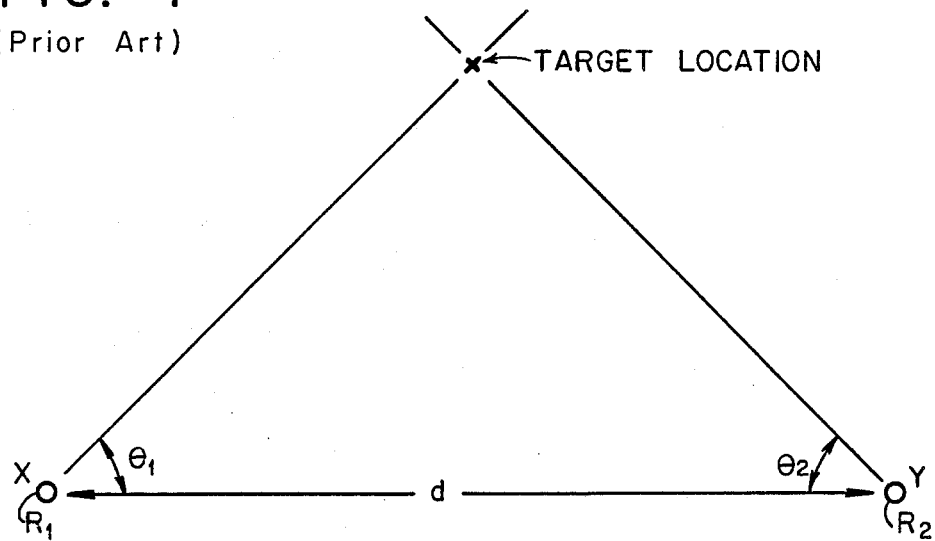
FIG. 1 is a diagram illustrating conventional triangulation ranging techniques.
Figure 2:
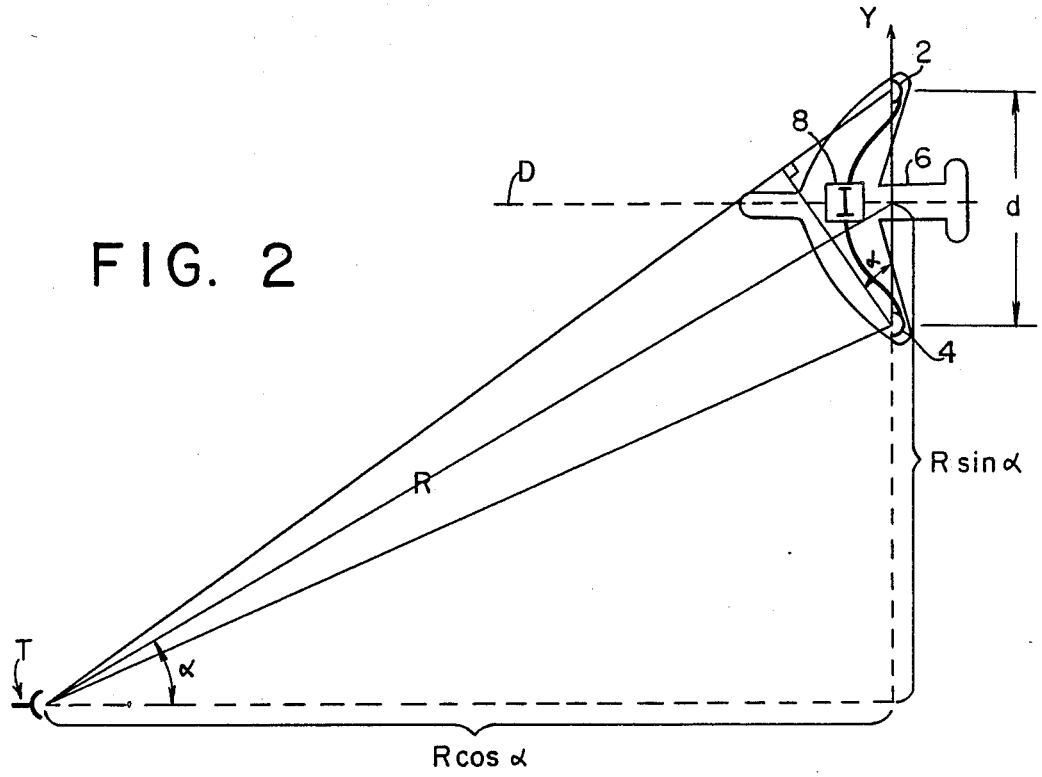
FIG. 2 is a pictorial diagram, shown in a top elevational view, of a threat and an aircraft, and the range and azimuth angle between the two.

Referring to FIG. 2 of the drawings, it will be seen that a passive doppler differential ranging system, constructed in accordance with the present invention, includes a pair of antennas 2, 4 preferably mounted on an aircraft 6. The antennas 2, 4 are spaced apart a known distance, d. Preferably, the antennas are positioned near the ends of the aircraft wings so as to increase the separation of the antennas as much as possible. The antennas 2, 4 are connected to an interferometer 8 or other device which is adapted to determine the azimuth angle, $\alpha$, of a threat, as well as other relevant parameters.

As illustrated by FIG. 2 of the drawings, the azimuth angle, $\alpha$, of the threat T with respect to the aircraft can be defined as the angle of the threat from the direction of motion of the aircraft (shown by a dashed line D) taken in a two-dimensional plane.

In accordance with the present invention, the interferometer 8 need only make one azimuth angle determination. The azimuth angle, $\alpha$, is measured at a first time, $t_o$.

The interferometer also makes a determination of the differential doppler phase shift at time $t_o$ between the first and second antennas 2, 4 of the received signal transmitted by the threat. A first differential doppler phase shift, $\Delta\phi$, is calculated using Equation 1 below:

$$\Delta\phi = \frac{2\pi d}{\lambda} \cdot \sin\alpha \quad \text{(Eq. 1)}$$

where $\lambda = \dfrac{\text{speed of light}}{\text{frequency of the received signal transmitted by the threat.}}$ At the first time, $t_o$, the threat range, R, can be broken into an X and Y component. The X component, also known as the parallel range, is equal to $R \cdot \cos\alpha$. The Y component of the range, which is also termed the lateral offset range, can be approximated as $R \cdot \sin\alpha$.

Accordingly, in accordance with well known interferometer principles, the differential phase shift $\Delta\phi$, can be calculated from Equation 1 shown above.

At a later time $t_1$, a new parallel range can be calculated. Given a velocity, v, of the aircraft, which is determined using well known techniques, the new parallel range at time $t_1$ is equal to the following:

New Parallel range at time $t_1 = R \cdot \cos\alpha - v\Delta t$ (Eq. 2)

where $\Delta t = t_1 - t_o$

It should be noted that $\Delta t$ will be on the order of milliseconds.

At time $t = t_1$, it may be assumed that the lateral offset range remains the same (as there would only be negligible change in this value), and would be equal to $R \cdot \sin\alpha$, as if the target were stationary in the Y component direction.

Accordingly, a new elevation or azimuth angle, $\alpha_1$, for time $t_1$ may be determined from the following equation without actually measuring $\alpha_1$:

$$\alpha_1 = \tan^{-1}\frac{R\sin\alpha}{R\cos\alpha - v\Delta t} \quad \text{(Eq. 3)}$$

A second differential doppler phase shift, $\Delta\phi_1$, may also be determined from the new azimuth angle, $\alpha_1$, determined above. $\Delta\phi_1$ is determined as follows:

$$\Delta\phi_1 = \frac{360 \cdot d}{\lambda} \cdot \sin\alpha_1 \quad \text{(Eq. 4)}$$

In accordance with the method of the present invention, the differential differential doppler phase shift is now determined. The differential differential doppler, $\Delta\Delta\phi$, is equal to $\Delta\phi_1 - \Delta\phi$, which may be stated another way as shown below:

$$\Delta\Delta\phi = \frac{360 \cdot d}{\lambda}[\sin\alpha_1 - \sin\alpha] \quad \text{(Eq. 5)}$$

By substituting everything to the right of the equal sign in Equation 3 for $\alpha_1$, into Equation 5, the following equation is derived:

$$\Delta\Delta\phi = \quad \text{(Eq. 6)}$$

$$\frac{360\, d}{\lambda}\left\{\sin\left[\tan^{-1}\left(\frac{R\sin\alpha}{R\cos\alpha - v\Delta t}\right)\right] - \sin\alpha\right\}$$

Solving for range, R, the following equation is derived:

$$R = \frac{v\Delta t}{\cos\alpha - \dfrac{\sin\alpha}{\tan\left[\sin^{-1}\left(\dfrac{\Delta\Delta\phi \cdot \lambda}{360 \cdot d} + \sin\alpha\right)\right]}}$$

where $\Delta t = t_1 - t_o$

Accordingly, it can be seen from the present invention that the threat range, R, at time $t_1$ may be determined from a single azimuth measurement, that is, azimuth angle $\alpha$, by calculating the differential differential doppler phase shift and knowing the velocity of the aircraft and the time when the first azimuth angle measurement is taken. Throughout the above calculations, it is evident that no second azimuth measurement need be made.

The advantages of the present invention include the rapid and accurate ranging of a threat and the requirement of little additional hardware. Because the interferometer 8 is capable of making the differential doppler phase shift measurement, very little additional hardware would be required to determine the differential differential doppler phase shift.

By determining the differential differential doppler phase shift, only one azimuth angle measurement need be made. The azimuth may be calculated from a Butler matrix or an interferometer passive measurement, each of which is well known in the art. The differential differential doppler phase shift, that is, the difference between the two antennas' doppler rates, is calculated by subtracting two doppler measurements which may be made by crosseye hardware not associated with the interferometer, or other devices.

Accordingly, the passive doppler differential ranging system and method of the present invention rapidly and inexpensively determines the range of a threat radar passively and does this faster and more accurately than present technology. The invention further uses a direct calculation instead of a complicated computer algorithm.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for use on an aircraft for determining the range, R, of a threat passively, which comprises the steps of:

mounting a first receiving antenna and a second receiving antenna on an aircraft and positioning the first and second antennas a known distance, d, apart from each other;

determining a first azimuth angle $\alpha$ of the threat with respect to the aircraft at a first time $t_o$, the azimuth angle o being defined as the angle of the threat from the direction of motion of the aircraft taken in a two-dimensional plane at the first time $t_o$;

determining a first differential doppler phase shift, $\Delta\phi$, between the first and second antennas of a received signal transmitted by the threat, using the equation:

$$\Delta\phi = \frac{2\pi d}{\lambda} \cdot \sin \alpha$$

where $\lambda = \frac{\text{speed of light}}{\text{frequency of the received signal transmitted by the threat}}$ measuring the velocity, v, of the aircraft;

determining a second differential doppler phase shift, $\Delta\phi_1$, at time $t_1$ between the first and second antennas of a received signal transmitted by the threat, using the equation:

$$\Delta\phi_1 = \frac{360 \cdot d}{\lambda} \sin\left(\tan^{-1}\left[\frac{R \sin \alpha}{R \cos \alpha} - v\Delta t\right]\right)$$

where $\Delta t = t_1 - t_o$ determining the differential differential doppler phase shift, $\Delta\Delta\phi$, by subtracting the first differential doppler phase shift, $\Delta\phi$, from the second differential doppler phase shift, $\Delta\phi_1$; and determining the range, R, of the threat at time $t_1$ by using the following equation:

$$R = \frac{v\Delta t}{\cos \alpha - \frac{\sin \alpha}{\tan\left[\sin^{-1}\left(\frac{\Delta\Delta\phi \cdot \lambda}{360 \cdot d} + \sin \alpha\right)\right]}}$$

where $\Delta t = t_1 - t_o$

2. A passive doppler differential ranging system, which comprises:

a first receiving antenna and a second receiving antenna mounted on an aircraft and positioned a known distance, d, apart from each other;

means for determining a first azimuth angle, $\alpha$, of the threat with respect to the aircraft at a first time $t_o$, the azimuth angle $\alpha$ being defined as the angle of the threat from the direction of motion of the aircraft taken in a two-dimensional plane at the first time $t_o$;

means for determining a first differential doppler phase shift, $\Delta\phi$, between the first and second antennas of a received signal transmitted by the threat at time $t_o$, using the equation:

$$\Delta\phi = \frac{2\pi d}{\lambda} \cdot \sin \alpha$$

where $\lambda = \frac{\text{speed of light}}{\text{frequency of the received signal transmitted by the threat}}$ means for measuring the velocity of the aircraft;

means for determining a second differential phase shift, $\Delta\phi_1$, between the first and second antennas of a received signal transmitted by the threat at a time $t_1$ which is later than time $t_o$, using the equation:

$$\Delta\phi_1 = \frac{360 \cdot d}{\lambda} \sin\left(\tan^{-1}\left[\frac{R \sin \alpha}{R \cos \alpha} - v\Delta t\right]\right)$$

where $\Delta t = t_1 - t_o$ where $\Delta t = t_1 - t_o$ means for determining the differential differential doppler phase shift, $\Delta\Delta\phi$, by subtracting the first differential doppler phase shift, $\Delta\phi$, from the second differential doppler phase shift, $\Delta\phi_1$; and means for determining the range, R, of the threat at time $t_1$ by using the following equation:

$$R = \frac{v\Delta t}{\cos \alpha - \frac{\sin \alpha}{\tan\left[\sin^{-1}\left(\frac{\Delta\Delta\phi \cdot \lambda}{360 \cdot d} + \sin \alpha\right)\right]}}$$

where $\Delta t = t_1 - t_o$

* * * * *